United States Patent
Ono et al.

(10) Patent No.: US 8,761,789 B2
(45) Date of Patent: Jun. 24, 2014

(54) WIRELESS TERMINAL, WIRELESS COMMUNICATION SYSTEM, AND AREA QUALITY INFORMATION COLLECTION METHOD

(75) Inventors: Fumihiko Ono, Tokyo (JP); Akio Aoyama, Tokyo (JP)

(73) Assignee: NEC Corporation, Tokyo (PA)

( * ) Notice: Subject to any disclaimer, the term of this patent is extended or adjusted under 35 U.S.C. 154(b) by 360 days.

(21) Appl. No.: 13/115,283

(22) Filed: May 25, 2011

(65) Prior Publication Data

US 2011/0294436 A1    Dec. 1, 2011

(30) Foreign Application Priority Data

Jun. 1, 2010  (JP) ................................. 2010-125683

(51) Int. Cl.
*H04W 72/00* (2009.01)
(52) U.S. Cl.
USPC ..................... 455/452.2; 455/574; 455/554.2; 370/332; 370/395.21
(58) Field of Classification Search
CPC ............ H04M 3/2227; H04M 15/8016; H04L 1/0001; H04W 72/1226; H04W 40/08–40/12; H04W 28/0221–28/0236; H04W 28/16; H04W 52/241
See application file for complete search history.

(56) References Cited

U.S. PATENT DOCUMENTS

| | | | |
|---|---|---|---|
| 2006/0079268 A1* | 4/2006 | Livet et al. ..................... | 455/522 |
| 2009/0215418 A1* | 8/2009 | Thomas et al. ............... | 455/231 |
| 2010/0233989 A1* | 9/2010 | Constien et al. ........... | 455/343.1 |

FOREIGN PATENT DOCUMENTS

| | | |
|---|---|---|
| JP | 2003204296 A | 7/2003 |
| JP | 2004214875 A | 7/2004 |
| JP | 2004274313 A | 9/2004 |
| JP | 2006-229382 A | 8/2006 |
| JP | 2006229295 A | 8/2006 |
| JP | 2007060189 A | 3/2007 |
| JP | 2007116244 A | 5/2007 |
| JP | 2008022065 A | 1/2008 |
| JP | 2008211361 A | 9/2008 |
| JP | 2008537859 A | 9/2008 |
| JP | 2008306240 A | 12/2008 |
| JP | 2008312223 A | 12/2008 |
| JP | 2009130448 A | 6/2009 |

(Continued)

OTHER PUBLICATIONS

NEC, "Triggers for measurement log reporting," 3GPP TSG-RAN2 Meeting #68bis, R2-100282, Internet <URL:http://www.3 gpp.org/ftp/tsg_ran!WG2 RL2/TSGR2 68bis/Docs/R2-1 00282.zip>, Jan. 18-22, 2010, Valencia, Spain. Cited in the JPOA.

(Continued)

*Primary Examiner* — Rafael Pérez-Gutiérrez
*Assistant Examiner* — Keith Fang
(74) *Attorney, Agent, or Firm* — Sughrue Mion, PLLC (57) ABSTRACT

A wireless terminal that carries out communication by a wireless circuit includes information acquisition means, transmission means, and transmission control means. The information acquisition means measures the communication quality of the wireless circuit. The transmission control means issues an instruction to the transmission means to transmit area quality information when basic transmission trigger conditions that have been determined in advance as time information are satisfied and when additional transmission trigger conditions are satisfied that have been determined that correspond to the state of the wireless terminal such that battery consumption is reduced. Upon receiving the instruction, the transmission means transmits area quality information that includes the communication quality that was measured by the information acquisition means.

8 Claims, 8 Drawing Sheets

(56) References Cited

FOREIGN PATENT DOCUMENTS

| | | |
|---|---|---|
| JP | 2009-182764 A | 8/2009 |
| JP | 2010081842 A | 4/2010 |
| JP | 2012-530401 A | 11/2012 |
| WO | 2008/136415 A1 | 11/2008 |
| WO | 2009/041498 A1 | 4/2009 |
| WO | WO 2010/021279 * | 2/2010 |

OTHER PUBLICATIONS

Japanese Office Action for JP Application No. 2010-125683 mailed on Nov. 19, 2013 with English Translation.

* cited by examiner

WIRELESS TERMINAL, WIRELESS COMMUNICATION SYSTEM, AND AREA QUALITY INFORMATION COLLECTION METHOD

This application claims the benefits of priority based on Japanese Patent Application No. 2010-125683 for which application was submitted on Jun. 1, 2010 and incorporates by citation all of the disclosures of that application.

BACKGROUND OF THE INVENTION

1. Field of the Invention

The present invention relates to a technology of collecting information that relates to the communication quality of areas from wireless terminals in a wireless communication system.

2. Description of the Related Art

Wireless communication systems that collect communication quality that is measured at wireless terminals are described in JP2008-537859A (Citation 1 and JP2008-312223A (Citation 2). Information of communication quality that is collected from wireless terminals present in each area is placed in association with time slots or information of the positions of the wireless terminals in which the communication quality was measured and used for the optimization of area design or maintenance of the wireless communication system.

For example, a wireless terminal measures communication quality when predetermined measurement trigger conditions are satisfied, the communication quality is recorded in association with position information that indicates the location of the wireless terminal at the time of measurement and time information of the time of measurement, and further, when predetermined transmission trigger conditions are satisfied, transmits the recorded communication quality, position information, and time information as area quality information to a server. The server accumulates the area quality information that was received from each wireless terminal. The area quality information that is stored in the server is then used in the optimization of area design or the maintenance of the wireless communication system.

SUMMARY OF THE INVENTION

As described hereinabove, The area quality information that is collected from wireless terminals is used on the system side for, for example, optimization of area design or system maintenance, and the measurement and transmission of communication quality by wireless terminals is not for the direct use of the wireless terminals or the users of the wireless terminals. Nevertheless, the power of the wireless terminals is consumed for measuring the communication quality and transmitting the area quality information that was measured to the server.

It is therefore to be desired that, in the process of collecting area quality information that is not for the direct benefit of the wireless terminals or users that the users of wireless terminals will not feel the consequences of the consumption of batteries. However, in the above-described Citations 1 and 2, no consideration is given to configurations or operations that will cause users to be less aware of the consumption of batteries.

It is an object of the present invention to provide a technology for collecting area quality information from wireless terminals while making users of the wireless terminals as unnoticeable as possible of the consumption of batteries.

To achieve the above-described object, the wireless terminal of the present invention is a wireless terminal that carries out communication by a wireless circuit and that includes:

information acquisition means that measures communication quality of the wireless circuits;

transmission means that, upon receiving an instruction, transmits area quality information that includes communication quality that was measured by the information acquisition means; and transmission control means that issues an instruction to the transmission means to transmit the area quality information when basic transmission trigger conditions that have been determined in advance as time information are satisfied and when additional transmission trigger conditions are satisfied that have been determined corresponding to the state of the wireless terminal such that battery consumption is reduced.

The wireless communication system of the present invention includes:

a wireless terminal that measures the communication quality of a wireless circuit and that transmits area quality information that includes the communication quality that was measured when basic transmission trigger conditions that have been determined in advance as time information are satisfied and when additional transmission trigger conditions are satisfied that have been determined corresponding to the state of the wireless terminal such that battery consumption is reduced; and a collection server that receives and accumulates the area quality information from the wireless terminal.

The area quality information collection method of the present invention includes steps of:

in a wireless terminal that carries out communication by a wireless circuit, measuring the communication quality of the wireless circuit; and when basic transmission trigger conditions that have been determined in advance as time information are satisfied and when additional transmission trigger conditions are satisfied that have been determined corresponding to the state of the wireless terminal such that the battery consumption is reduced, transmitting area quality information that includes the communication quality that was measured to a collection server.

DETAILED DESCRIPTION OF THE PREFERRED EMBODIMENTS

An embodiment of the present invention is next described in detail with reference to the accompanying drawings.

Figure 1:
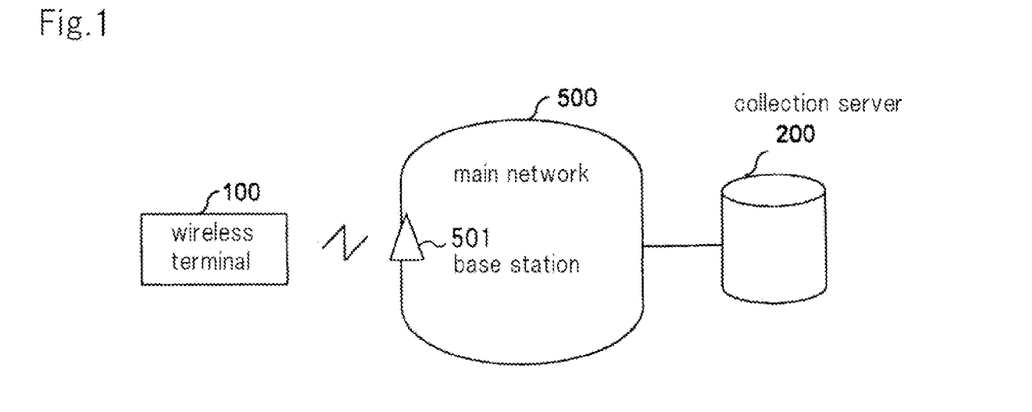
FIG. 1 is a block diagram showing the schematic configuration of the wireless communication system according to the present exemplary embodiment.

FIG. 1 is a block diagram showing the schematic configuration of the wireless communication system according to the present exemplary embodiment. Referring to FIG. 1, the wireless communication system of the present exemplary embodiment includes wireless terminal 100 and collection server 200. Wireless terminal 100 and collection server 200 are connected to main network 500.

Main network 500 is a network that forms an area of wireless circuits by means of base station 501 and connects with wireless terminal 100 in the area by a wireless circuit, and is the chief network with which wireless terminal 100 connects. For example, if wireless terminal 100 is a portable telephone, main network 500 is the portable telephone network to which the user of the portable telephone subscribes.

Wireless terminal 100 is equipped with, in addition to functions for connecting with base station 501 of main network 500 by a wireless circuit and executing speech communication or data communication that is desired by the user, functions for measuring the communication quality of the wireless circuit at its location and transmitting the communication quality to collection server 200.

Basic transmission trigger conditions and additional transmission trigger conditions are set in wireless terminal 100 as conditions for transmitting the communication quality that was measured. The basic transmission trigger conditions are determined in advance as time information such as the transmission start time, the transmission end time, and the transmission interval.

The additional transmission trigger conditions are determined corresponding to the state of wireless terminal 100 such that the power consumption of wireless terminal 100 is reduced. One example that can be offered of the additional transmission trigger conditions is a condition in which the estimated propagation loss of the wireless circuit be equal to or less than a predetermined threshold value.

Wireless terminal 100 measures the communication quality of the wireless circuit with base station 501 and transmits area quality information that includes the measured communication quality to collection server 200 when the basic transmission trigger condition, and further, when the additional transmission trigger condition are satisfied.

Collection server 200 that is connected to main network 500 accumulates the area quality information that is received from wireless terminal 100.

In FIG. 1, only one base station 501 and one wireless terminal 100 are shown, but in reality, a plurality of base stations 501 are normally arranged, and a plurality of wireless terminals 100 are present in the area of each base station 501. Information of the communication quality of each area is then accumulated in collection server 200 from the plurality of wireless terminals 100. The information that is accumulated in collection server 200 is used in, for example, the optimization of area design and maintenance of main network 500.

Figure 2:
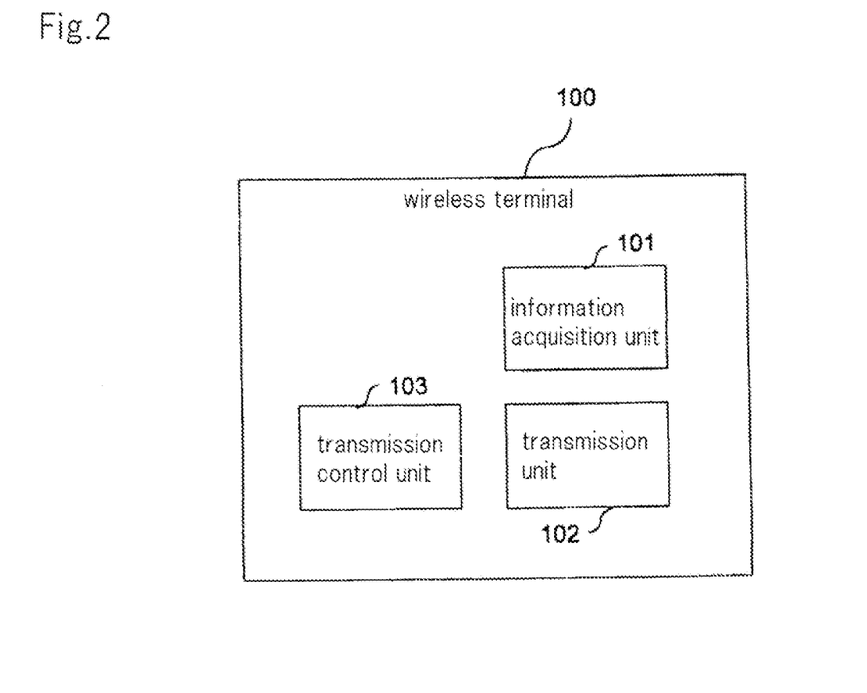
FIG. 2 is a block diagram showing the schematic configuration of wireless terminal 100 of the present exemplary embodiment.

FIG. 2 is a block diagram showing the schematic configuration of wireless terminal 100 of the present exemplary embodiment. Referring to FIG. 2, wireless terminal 100 includes information acquisition unit 101, transmission unit 102, and transmission control unit 103.

Information acquisition unit 101 measures the communication quality of the wireless circuit with base station 501.

Transmission unit 102, upon receiving an instruction from transmission control unit 103, transmits area quality information that includes the communication quality that was measured by information acquisition unit 101 to collection server 200.

Transmission control unit 103 issues an instruction to transmission unit 102 to transmit area quality information when the basic transmission trigger conditions have been satisfied, and further, when the additional transmission trigger conditions have been satisfied.

As has been described hereinabove, wireless terminal 100 according to the present exemplary embodiment transmits area quality information when the additional transmission trigger conditions are satisfied that have been determined corresponding to the state of wireless terminal 100 such that power consumption is reduced, whereby power consumption is reduced and the user can remain as unaffected as possible by the consumption of battery power of wireless terminal 100 due to processes for collecting area quality information.

Concrete examples of the present exemplary embodiment are next described.

Example 1

Figure 3:
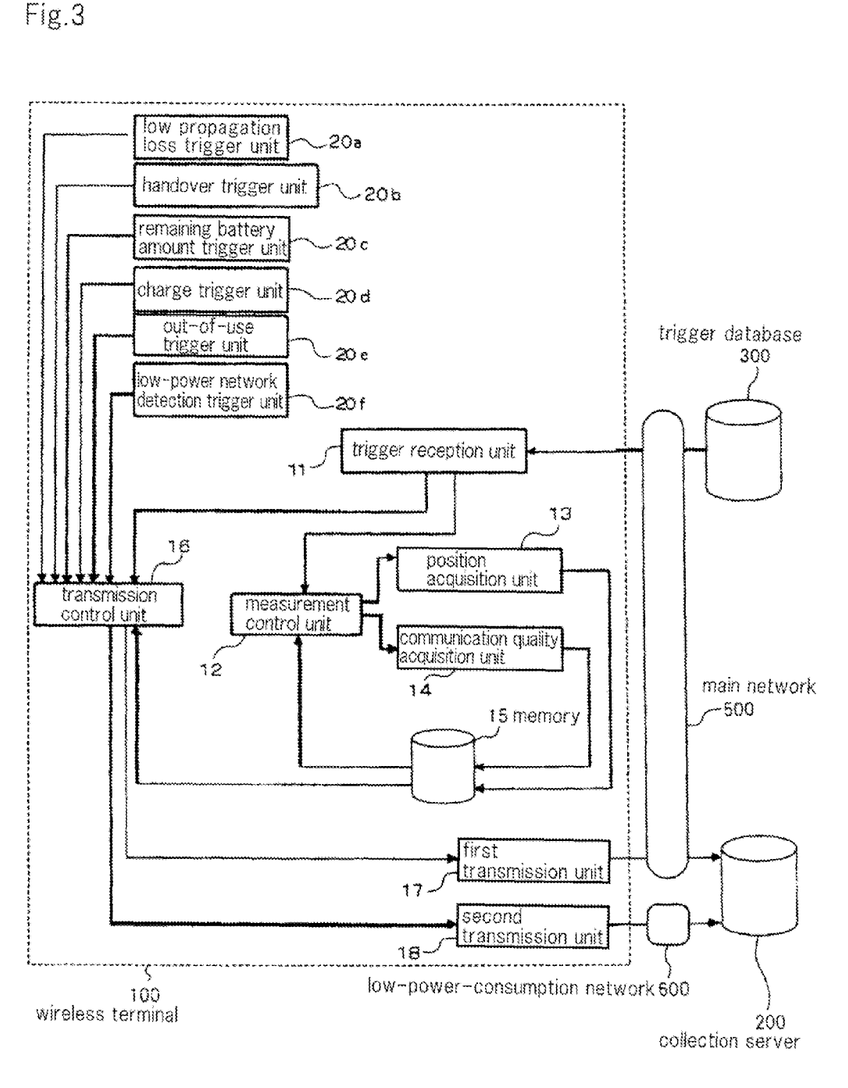
FIG. 3 is a block diagram showing the configuration of the wireless communication system and a wireless terminal of the system according to Example 1.

FIG. 3 is a block diagram showing the configuration of the wireless communication system and a wireless terminal of the system according to Example 1. Referring to FIG. 3, the wireless communication system according to the Example 1 includes wireless terminal 100, collection server 200, and trigger database 300.

Wireless terminal 100 is connected to collection server 200 and trigger database 300 by way of main network 500. In addition, wireless terminal 100 is connected to collection server 200 by way of low-power-consumption network 600.

As a typical example, wireless terminal 100 may be a portable telephone that operates by an incorporated battery, but wireless terminal 100 may also be a wireless terminal that is installed in a notebook personal computer, a wireless device mounted in a vehicle, or a wireless terminal that is incorporated in a mechanical device, or alternatively, a power-generating function may be equipped in a wireless terminal 100.

Wireless terminal 100 can also be connected to, apart from main network 500, low-power-consumption network 600 for which the power consumption of wireless terminal 100 is lower than for main network 500. Low-power-consumption network 600 is, for example, a short-distance wireless circuit network or a cable circuit network.

Wireless terminal 100 includes: trigger reception unit 11, measurement control unit 12, position acquisition unit 13, communication quality acquisition unit 14, memory 15, transmission control unit 16, transmission units 17 and 18, low propagation loss trigger unit 20*a*, handover trigger unit 20*b*, remaining battery amount trigger unit 20*c*, charge trigger unit 20*d*, out-of-use trigger unit 20*e*, and low-power network detection trigger unit 20*f*.

Low propagation loss trigger unit 20*a*, handover trigger unit 20*b*, remaining battery amount trigger unit 20*c*, charge trigger unit 20*d*, out-of-use trigger unit 20*e*, and low-power network detection trigger unit 20*f* are used in judging the additional transmission trigger conditions that are trigger conditions relating to transmission that is determined to reduce power consumption.

First transmission unit 17 transmits area quality information that is given to collection server 200 by way of main network 500.

Second transmission unit 18 transmits area quality information that is given to collection server 200 by way of low-power-consumption network 600.

Trigger reception unit 11 receives basic measurement trigger conditions and basic transmission trigger conditions from trigger database 300, and transmits each of these conditions to measurement control unit 12 and transmission control unit 16. The basic measurement trigger conditions are trigger conditions relating to measurement that are determined as time information such as the measurement start time, measurement end time, and the measurement interval. The basic transmission trigger conditions are trigger conditions relating to transmission that are determined as time information such as the transmission start time, the transmission end time and the transmission interval.

Measurement control unit 12 controls the measurement of position information and communication quality based on the basic measurement trigger conditions that have been given. Upon determining that the measurement timing determined by the basic measurement trigger conditions has arrived, measurement control unit 12 issues instructions to position acquisition unit 13 and communication quality acquisition unit 14 to carry out measurement.

In accordance with the instruction that was given, position acquisition unit 13 acquires position information of its own terminal by GPS (Global Positioning System) and records the information in memory 15.

In accordance with the instruction that was given, communication quality acquisition unit 14 measures the communication quality of the wireless circuit and records the information in memory 15.

Time information indicating the measurement timing, position information acquired by position acquisition unit 13, and communication quality acquired by communication quality acquisition unit 14 are recorded in association with each other in memory 15.

Transmission control unit 16 controls the transmission of area quality information to collection server 200 based on the trigger conditions that are given. The trigger conditions that are given to transmission control unit 16 include additional transmission trigger conditions in addition to the basic transmission trigger conditions from trigger database 300. If the additional transmission trigger conditions are satisfied at the transmission timing that is determined by the basic transmission trigger conditions, transmission control unit 16 issues an instruction to first transmission unit 17 or second transmission unit 18 to transmit area quality information that includes the measurement time information, position information, and communication quality that are recorded in memory 15 to collection server 200.

Transmission control unit 16 uses low propagation loss trigger unit 20a, handover trigger unit 20b, remaining battery amount trigger unit 20c, charge trigger unit 20d, out-of-use trigger unit 20e, or low-power network detection trigger unit 20f in judging whether the additional transmission trigger conditions have been satisfied.

Collection server 200 receives and saves the area quality information from wireless terminal 100.

Trigger database 300 holds the trigger conditions for collecting area quality information from wireless terminal 100 and transmits these trigger conditions to wireless terminal 100. The trigger conditions transmitted by trigger database 300 include the basic measurement trigger conditions and the basic transmission trigger conditions.

The operations of the wireless communication system of the present example are next described.

Figure 4:
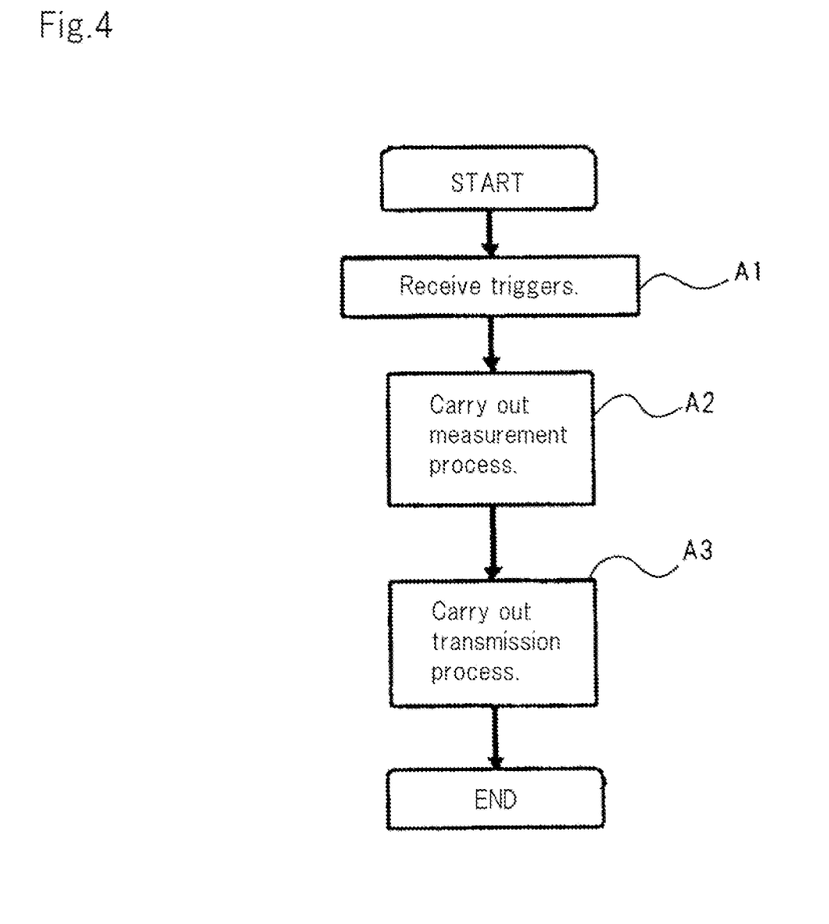
FIG. 4 is a flow chart showing a series of operations of wireless terminal 100 in Example 1.

FIG. 4 is a flow chart showing the series of operations in Example 1.

Trigger database 300 first transmits the trigger conditions possessed by trigger database 300 to wireless terminal 100. These trigger conditions include the basic measurement trigger conditions and the basic transmission trigger conditions. Wireless terminal 100 receives the trigger conditions from trigger database 300 in trigger reception unit 11 (Step A1).

Upon receiving the trigger conditions, trigger reception unit 11 transmits, of the trigger conditions, the basic measurement trigger conditions to measurement control unit 12 and transmits the basic transmission trigger conditions to transmission control unit 16, whereby the basic measurement trigger conditions are set in measurement control unit 12 and the basic transmission trigger conditions are set in transmission control unit 16.

Wireless terminal 100 next executes the measurement process (Step A2). In the measurement process, measurement control unit 12 of wireless terminal 100 first determines whether the basic measurement trigger conditions have been satisfied or not. If the basic measurement trigger conditions have been satisfied, measurement control unit 12 issues instructions to carry out measurement to position acquisition unit 13 and communication quality acquisition unit 14.

Position acquisition unit 13, having received the measurement instruction, acquires the current position of its own terminal and saves the acquired position information in memory 15. In addition, communication quality acquisition unit 14, having received the measurement instruction, measures the communication quality of the wireless circuit and saves the information of the acquired communication quality in memory 15. The position information and the communication quality are recorded together with time information in memory 15. Wireless terminal 100 next executes the transmission process (Step A3).

In the transmission process, transmission control unit 16 of wireless terminal 100 judges whether the basic transmission trigger conditions that were assigned from trigger reception unit 11 have been satisfied or not. If the basic transmission trigger conditions have been satisfied, transmission control unit 16 next determines whether the additional transmission trigger conditions have been satisfied or not. The additional transmission trigger conditions and their determination are described in detail hereinbelow.

If the additional transmission trigger conditions have been satisfied, transmission control unit 16 transmits area quality information that includes the position information and communication quality that are saved in memory 15 to collection server 200 by way of first transmission unit 17 or second transmission unit 18.

Figure 5:
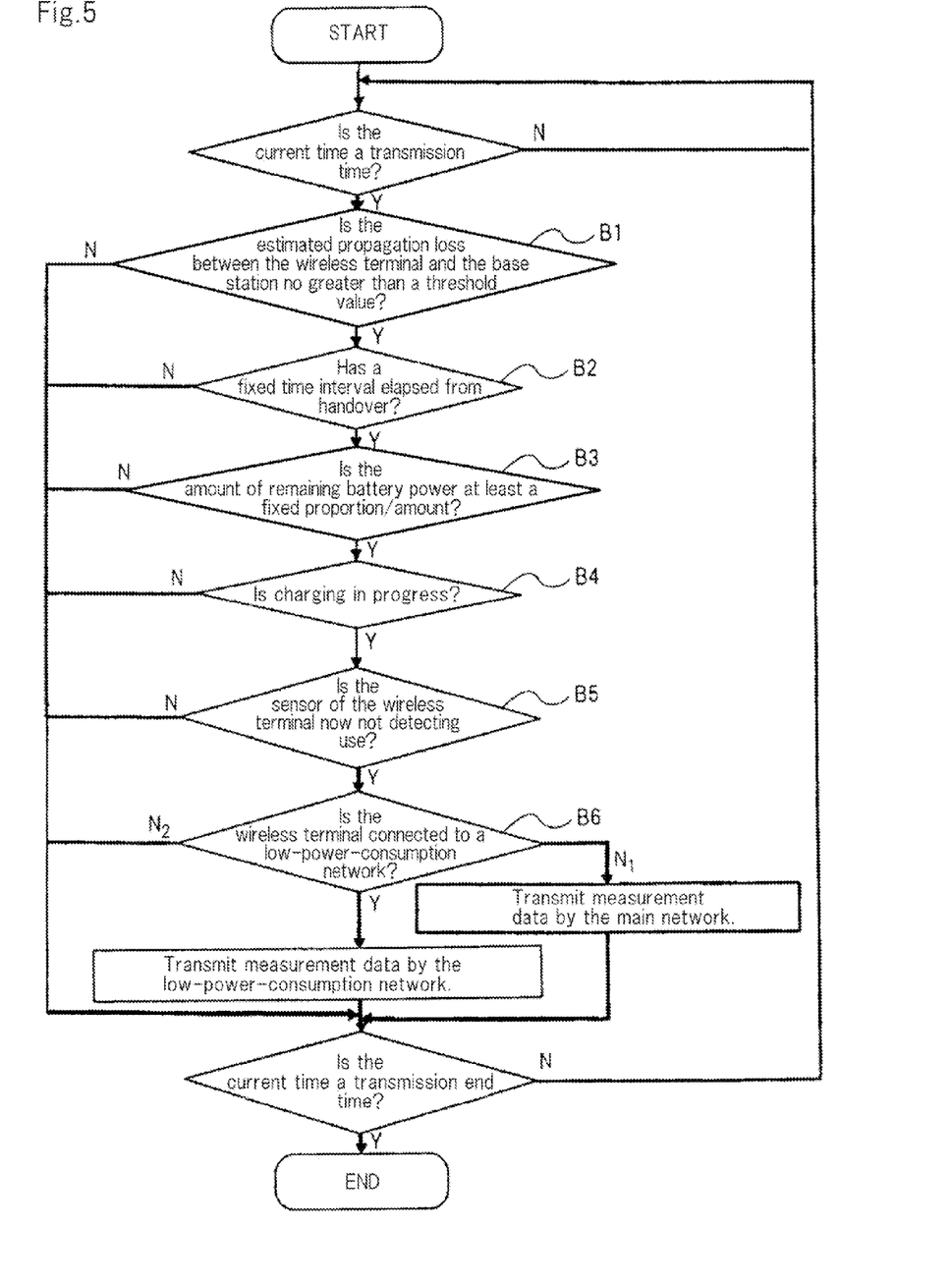
FIG. 5 is a flow chart that shows an example of the operations of wireless terminal 100 following the determination that the basic transmission trigger conditions have been satisfied.

An example of the operations of wireless terminal 100 following determination that the basic transmission trigger conditions have been satisfied is next described. FIG. 5 is a flow chart showing an example of the operations of wireless terminal 100 following determination that the basic transmission trigger conditions have been satisfied. Here, a low propagation loss trigger condition, a handover trigger condition, a remaining battery amount trigger condition, a charge trigger condition, an out-of-use trigger condition, and a low-power network detection trigger condition are set as the additional transmission trigger conditions.

Step B1: Low Propagation Loss Trigger Condition

When wireless terminal 100 carries out communication by way of base station 501, transmission control unit 16 determines whether the low propagation loss trigger condition has been satisfied or not by submitting an inquiry to low propagation loss trigger unit 20a. The low propagation loss trigger condition is a trigger condition that the estimated propagation loss between wireless terminal 100 and base station 501 is no greater than a threshold value.

Low propagation loss trigger unit 20a, having received the inquiry, estimates the propagation loss between wireless terminal 100 and base station 501 based on the difference between the transmission power of base station 501 and the reception power in wireless terminal 100. When the propagation loss is no greater than the threshold value, low propagation loss trigger unit 20a determines that the low propagation loss trigger condition has been satisfied and notifies this determination to transmission control unit 16. Transmission control unit 16 receives this notification and next proceeds to the determination of the additional transmission trigger conditions. If there is not a succeeding additional transmission trigger condition, transmission control unit 16 submits an instruction to first transmission unit 17 to transmit information that is saved in memory 15.

Step B2: Handover Trigger Condition

Transmission control unit 16 determines whether the handover trigger condition has been satisfied or not by submitting an inquiry to handover trigger unit 20b. The handover trigger condition is a trigger condition that a fixed time interval has elapsed from the last time wireless terminal 100 performed handover until the current time.

Handover trigger unit 20b, having received the inquiry, verifies the handover history of wireless terminal 100. When a fixed time interval has elapsed from the last time wireless terminal 100 performed handover until the current time, handover trigger unit 20b determines that the handover trigger condition has been satisfied and notifies this information to transmission control unit 16. Transmission control unit 16, having received this notification, proceeds to the determination of the next trigger condition. If there is no succeeding additional transmission trigger condition, transmission control unit 16 issues an instruction to first transmission unit 17 to transmit the information that is saved in memory 15.

Step B3: Remaining Battery Amount Trigger

Transmission control unit 16 determines whether the remaining battery amount trigger condition has been satisfied or not by submitting an inquiry to remaining battery amount trigger unit 20c. The remaining battery amount trigger condition is a trigger condition that the amount of remaining battery power of wireless terminal 100 is at least a fixed proportion or at least a fixed amount.

Remaining battery amount trigger unit 20c, having received the inquiry, first verifies the amount of remaining battery power of wireless terminal 100. If the amount of remaining battery power is at least a fixed proportion or at least a fixed amount, remaining battery amount trigger unit 20c judges that the remaining battery amount trigger condition has been met and notifies this information to transmission control unit 16. Transmission control unit 16, having received this notification, proceeds to the determination of the next trigger condition. If there is no succeeding additional transmission trigger condition, transmission control unit 16 issues an instruction to first transmission unit 17 to transmit the information that is saved in memory 15.

Step B4: Charge Trigger

Transmission control unit 16 determines whether the charge trigger condition has been satisfied or not by submitting an inquiry to charge trigger unit 20d. The charge trigger condition is a trigger condition that a fixed time interval has elapsed from the start of charging of wireless terminal 100 or from the time of placing wireless terminal 100 on a battery charger.

Charge trigger unit 20d, having received the inquiry, first checks the charged state of wireless terminal 100. When a fixed time interval has elapsed from the start of charging of wireless terminal 100 or from the time wireless terminal 100 was placed on a battery charger, charge trigger unit 20d judges that the charge trigger condition has been satisfied and notifies this information to transmission control unit 16. Transmission control unit 16, having received this notification, proceeds to the determination of the next trigger condition. If there is no succeeding additional transmission trigger condition, transmission control unit 16 issues an instruction to first transmission unit 17 to transmit the information that is saved in memory 15.

Step B5: Out-of-Use Trigger

Transmission control unit 16 determines whether the out-of-use trigger condition has been satisfied or not by submitting an inquiry to out-of-use trigger unit 20e. The out-of-use trigger condition is a trigger condition that wireless terminal 100 is assumed not to be in use by a user. The determination of whether wireless terminal 100 is being used by a user can be realized by, for example, detection information from a sensor that is provided in wireless terminal 100. For example, it may be determined based on the detection information of an acceleration sensor that the user is not using wireless terminal 100 if the attitude of wireless terminal 100 has not changed at all for at least a fixed time interval (for example, 10 minutes). In addition, if wireless terminal 100 employs a touch-panel display, a condition may further be added that there has been no touch input for at least a fixed time interval (for example, ten minutes).

If out-of-use trigger unit 20e, having received the inquiry, infers that the user is not using wireless terminal 100 based on detection information of a sensor, out-of-use trigger unit 20e determines that the out-of-use trigger condition has been satisfied and notifies this information to transmission control unit 16. Transmission control unit 16, having received this notification, proceeds to the determination of the next trigger condition. If there is no succeeding additional transmission trigger condition, transmission control unit 16 issues an instruction to first transmission unit 17 to transmit the information that is saved in memory 15.

Step B6: Low-Power Network Detection Trigger

Transmission control unit 16 determines whether the low-power network detection trigger condition has been satisfied or not by submitting an inquiry to low-power network detection trigger unit 20f.

The low-power network detection trigger condition is a trigger condition that connection has been made to a low-power-consumption network 600. Low-power-consumption network 600 is a network for which the power consumption of wireless terminal 100 is less than for main network 500, and may be, for example, a cable LAN or WiFi communication.

Low-power network detection trigger unit 20f, having received the inquiry, first checks the network connection state of wireless terminal 100. If wireless terminal 100 is connected to low-power-consumption network 600 in addition to main network 500, low-power network detection trigger unit 20f determines that the low-power network detection trigger condition has been satisfied and notifies this information to transmission control unit 16. Transmission control unit 16, having received this notification, issues an instruction to second transmission unit 18 to transmit area quality information that includes the information that is saved in memory 15. Second transmission unit 18, having received this instruction, extracts the information that is saved in memory 15 and transmits the information as area quality information to collection server 200 by way of low-power-consumption network 600.

When wireless terminal 100 is connected to main network 500 but is not connected to low-power-consumption network 600, low-power network detection trigger unit 20*f* determines that the low-power network detection trigger condition is not satisfied (N1 of FIG. 5) and notifies this information to transmission control unit 16. Transmission control unit 16, having received this notification, issues an instruction to first transmission unit 17 to transmit area quality information. First transmission unit 17, having received this instruction, extracts the information that is saved in memory 15 and transmits the information as area quality information to collection server 200 by way of main network 500.

When it is determined in Steps B1-B5 that trigger conditions are not satisfied, or when it is determined in Step B6 that wireless terminal 100 is not connected to either main network 500 or low-power-consumption network 600, transmission control unit 16 will not carry out the transmission of area quality information.

Further, if the transmission end time that was determined by the basic transmission trigger conditions has not been reached, transmission control unit 16 again repeats the transmission process.

The above-described additional transmission trigger conditions may be independent of each other and used singly, may be freely combined and used as a plurality, or may all be used. In addition, when a plurality of the conditions is used, the order of determination can be freely set.

As described in the foregoing explanation, according to the present example, the rapid consumption of the battery can be made less apparent to the user by setting additional transmission trigger conditions in transmitting area quality information. The results of each of the trigger conditions are next shown.

Low Propagation Loss Trigger Condition:

By transmitting area quality information during a satisfactory communication state in which the propagation loss between wireless terminal 100 and base station 501 is no greater than a predetermined value, the power consumption of wireless terminal 100 can be reduced and the rapid consumption of battery power can be made less noticeable to the user.

Handover Trigger Condition:

It can be assumed that wireless terminal 100 is in the vicinity of a cell boundary immediately after handover. The transmission of area quality information at the edge of a cell requires greater transmission power than at the center of a cell. As a result, suppressing transmission that occurs within a fixed time interval from the last execution of handover can reduce the chance that wireless terminal 100 will consume greater battery power and can make the rapid consumption of battery power less noticeable to the user.

Remaining Battery Amount Trigger Condition:

A user tends to be more keenly aware of the consumption of battery power when little battery power remains. As a result, not transmitting area quality information when the amount of remaining battery power falls below a fixed proportion or below a fixed amount can make the rapid consumption of battery power less apparent to the user.

Charge Trigger Condition:

During charging, battery power consumed due to the transmission of area quality information is immediately replenished. As a result, the rapid consumption of battery power during charging is hardly perceived by the user. In particular, it can be assumed that at least a fixed amount of power has accumulated in the battery after a fixed time interval from the start of charging or from placing wireless terminal 100 in a charging device. Because a user tends not to be keenly aware of the consumption of battery power when there is an adequate amount of remaining battery power, transmitting area quality information in this state can make the rapid consumption of battery power less apparent to the user.

Out-of-Use Trigger Condition:

When the user is not in contact with wireless terminal 100, the user tends not to be keenly aware of the consumption of the battery power, and as a result, carrying out transmission of area quality information in this state can make the rapid consumption of battery power less apparent to the user.

Low-Power Network Detection Trigger Condition:

When the user is connected to a network such as a cable LAN or WiFi communication in which the power consumption of wireless terminal 100 is reduced, carrying out transmission of area quality information by the network in which power consumption is limited can reduce the power consumption of wireless terminal 100 and can make the rapid consumption of battery power less apparent to the user.

Example 2

Figure 6:
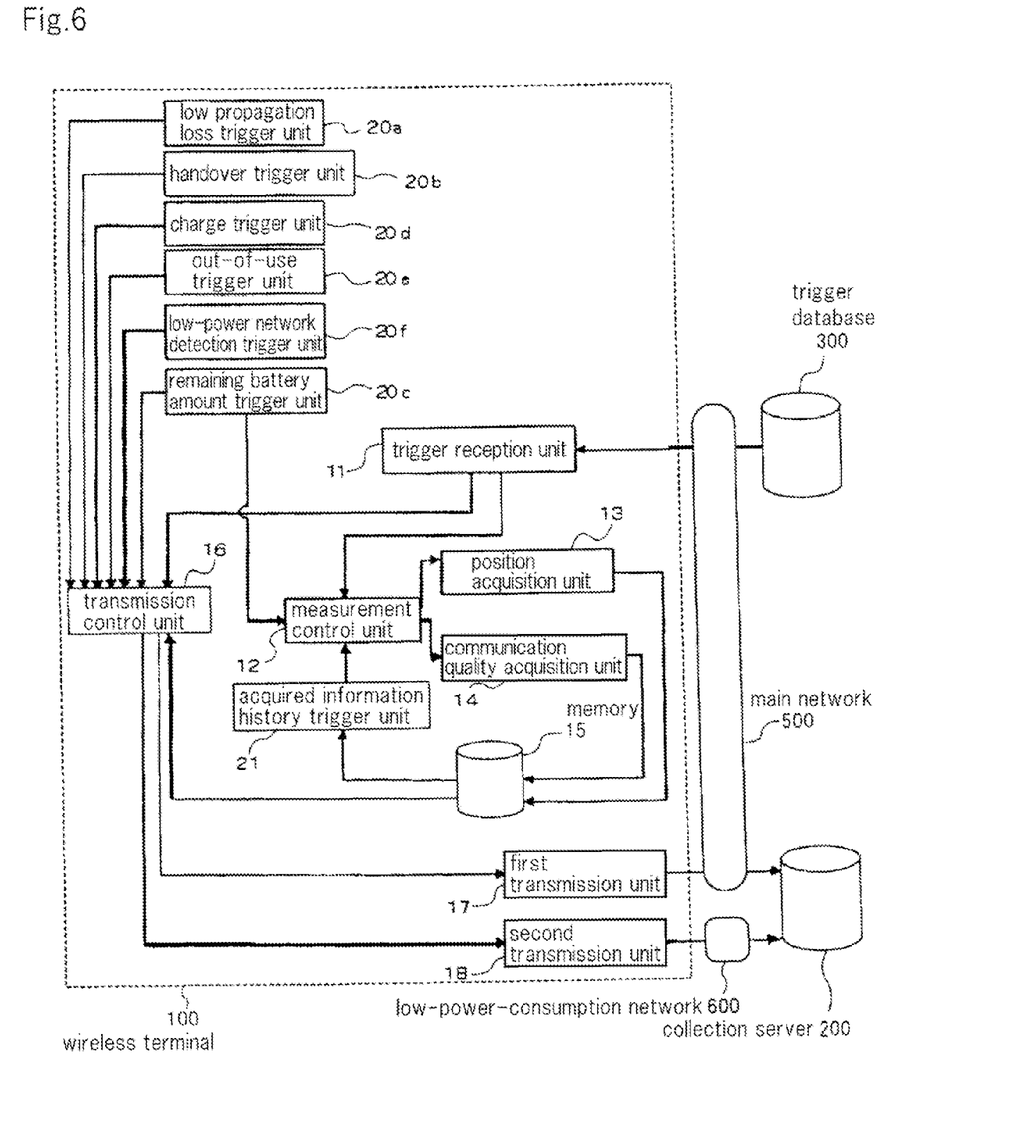
FIG. 6 is a block diagram showing the configuration of the wireless communication system and a wireless terminal of the system according to Example 2.

FIG. 6 is a block diagram showing the configuration of the wireless communication system and the wireless terminal of this system according to Example 2. Referring to FIG. 6, the wireless communication system according to Example 2 includes wireless terminal 100, collection server 200, and trigger database 300, as in the system according to Example 1.

Wireless terminal 100 is connected to collection server 200 and trigger database 300 by way of main network 500. In addition, wireless terminal 100 is further connected to collection server 200 by way of low-power-consumption network 600.

As a typical example, wireless terminal 100 is a portable telephone that operates by a built-in battery, but wireless terminal 100 may also be a wireless terminal that is installed in a notebook personal computer, a wireless device mounted in a vehicle, or a wireless terminal incorporated in a mechanical device, or alternatively, a power generation function may be provided in wireless terminal 100.

Wireless terminal 100 can be connected to, in addition to main network 500, low-power-consumption network 600 for which the power consumption of wireless terminal 100 is lower than for main network 500. Low-power-consumption network 600 is, for example, a short-distance wireless circuit network or a cable circuit network.

Wireless terminal 100 includes trigger reception unit 11, measurement control unit 12, position acquisition unit 13, communication quality acquisition unit 14, memory 15, transmission control unit 16, transmission units 17 and 18, low propagation loss trigger unit 20*a*, handover trigger unit 20*b*, remaining battery amount trigger unit 20*c*, charge trigger unit 20*d*, out-of-use trigger unit 20*e*, low-power network detection trigger unit 20*f*, and acquired information history trigger unit 21.

As in Example 1, low propagation loss trigger unit 20*a*, handover trigger unit 20*b*, remaining battery amount trigger unit 20*c*, charge trigger unit 20*d*, out-of-use trigger unit 20*e*, and low-power network detection trigger unit 20*f* are used in the determination of additional transmission trigger conditions that are trigger conditions relating to transmission and that are determined such that power consumption is reduced.

Acquired information history trigger unit 21 is used according to necessity in the determination of additional measurement trigger conditions that are trigger conditions relating to measurement and that are determined such that power consumption is reduced.

The operations of each of trigger reception unit 11, position acquisition unit 13, communication quality acquisition unit 14, memory 15, transmission control unit 16, first transmission unit 17, second transmission unit 18, low propagation loss trigger unit 20a, handover trigger unit 20b, remaining battery amount trigger unit 20c, charge trigger unit 20d, out-of-use trigger unit 20e, and low-power network detection trigger unit 20f are basically identical to those of Example 1.

The operations of collection server 200 and trigger database 300 are also basically identical to those of Example 1.

In the present example, measurement control unit 12 of wireless terminal 100 controls the measurement of communication quality and position information based on the trigger conditions that have been given. The trigger conditions that are given to measurement control unit 12 include additional measurement trigger conditions in addition to the basic measurement trigger conditions from trigger database 300. At the measurement timing that is determined by the basic measurement trigger conditions, measurement control unit 12 brings about the measurement processes in position acquisition unit 13 and communication quality acquisition unit 14 based on the determinations of the additional measurement trigger conditions. As a result, measurement control unit 12 causes completion of the acquisition of position information by position acquisition unit 13 and the acquisition of communication quality by communication quality acquisition unit 14 if all of the additional measurement trigger conditions are satisfied at the measurement timing that is determined by the basic measurement trigger conditions.

In the determination of whether the additional measurement trigger conditions have been satisfied or not, measurement control unit 12 uses acquired information history trigger unit 21 to carry out determination in the case of trigger conditions that are determined using information that was acquired in the past.

The operations of the wireless communication system of the present example are next described.

The series of operations of wireless terminal 100 in Example 2 is basically the same flow as the flow chart shown in FIG. 4.

The operation of Step A1 in Example 2 is the same as the operation in Example 1. As the measurement process in Example 2, measurement control unit 12 determines whether the basic measurement trigger conditions that were received from trigger reception unit 11 are satisfied or not (Step A2).

If the basic measurement trigger conditions are satisfied, measurement control unit 12 further carries out measurement operations based on the additional measurement trigger conditions.

Figure 7:
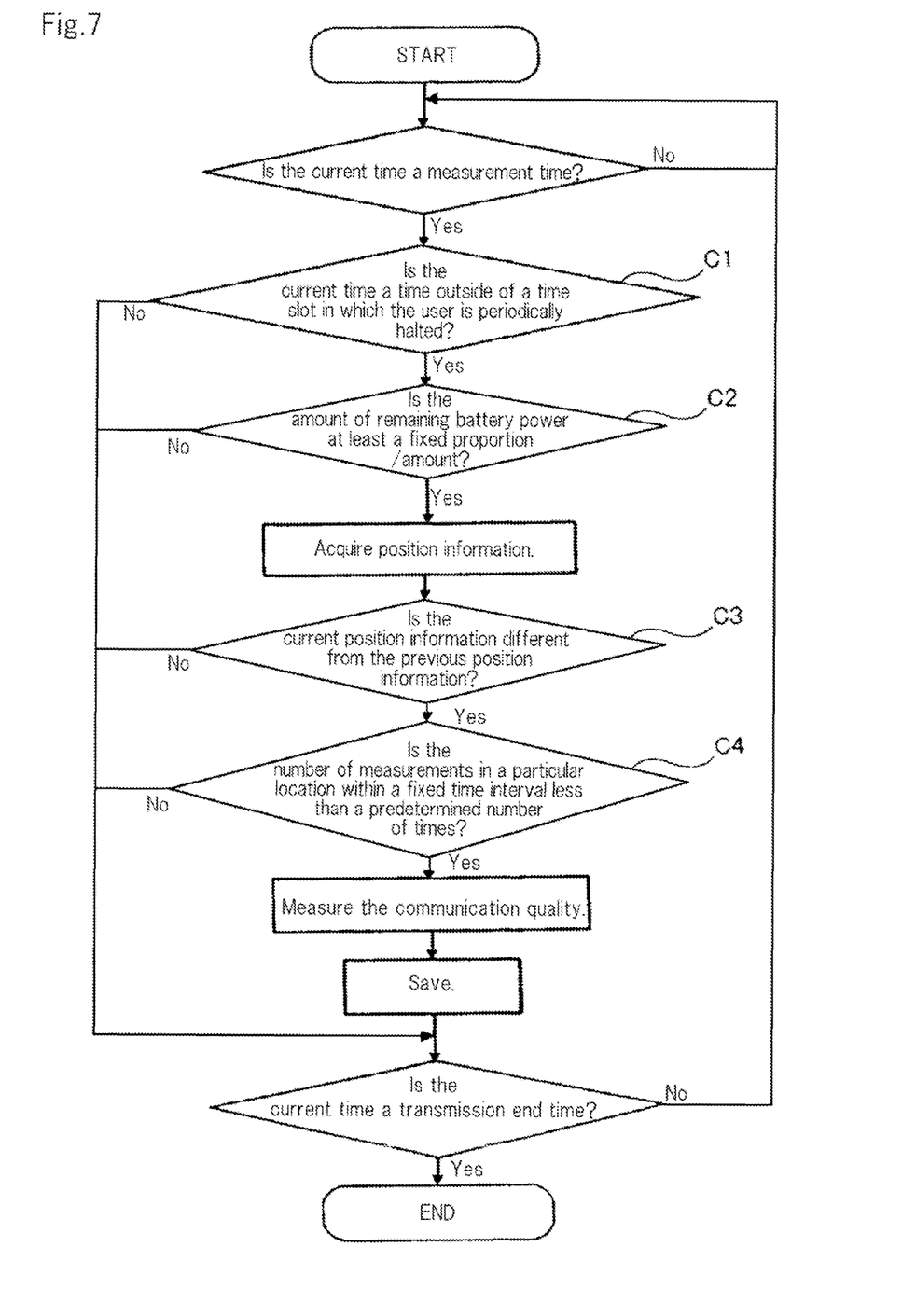
FIG. 7 is a flow chart showing an example of the measurement operations of wireless terminal 100 following the determination that the basic measurement trigger conditions have been satisfied.

FIG. 7 is a flow chart showing an example of the measurement operations of wireless terminal 100 that follow determination that the basic measurement trigger conditions are satisfied.

Step C1: Acquired Information History Trigger Condition (Halt Time Determination)

Measurement control unit 12 determines whether the acquired information history trigger condition (halt time determination) is satisfied or not by submitting an inquiry to acquired information history trigger unit 21. The acquired information history trigger condition (halt time determination) is a condition such that the current time is not within a periodic time interval in which the user does not move within a fixed time interval (for example, one day).

Acquired information history trigger unit 21, having received the inquiry, first refers to the history of position information of wireless terminal 100 that has been measured in the past from memory 15. Acquired information history trigger unit 21 next calculates based on the past position history of wireless terminal 100 whether there is a periodic time interval (user halt time) in which the user does not move during the day. If there is a user halt time interval, acquired information history trigger unit 21 determines whether the current time is outside the user halt time interval or not. When the current time is outside the user halt time interval, acquired information history trigger unit 21 notifies measurement control unit 12 that the acquired information history trigger condition (halt time determination) has been satisfied. Measurement control unit 12, having received this notification, proceeds to the determination of the next trigger conditions. If there is no succeeding additional measurement trigger condition, measurement control unit 12 issues an instruction to position acquisition unit 13 to acquire position information.

An example of the method of calculating the user halt time interval is shown next.

Calculation Example 1

It is here assumed that, based on the history of position information of the past month, the user halt time interval is weekdays from 9:00 am to 11:00 am if a user does not move from a radius range of within 10 meters from 9:00 am to 11:00 am on at least four weekdays within a week.

Calculation Example 2

It is assumed that, based on the history of position information of the past month, the user halt time interval is from 9:00 am to 11:00 am of a specific day of the week if the user does not move from a radius range of within 5 meters from 9:00 am to 11:00 am on that specific day of the week.

Step C2: Remaining Battery Amount Trigger:

Measurement control unit 12 determines whether the remaining battery amount trigger condition is satisfied or not by submitting an inquiry to remaining battery amount trigger unit 20c. The remaining battery amount trigger condition is a condition in which the amount of remaining battery power of wireless terminal 100 is at least a fixed proportion or at least a fixed amount.

Remaining battery amount trigger unit 20c, having received the inquiry, checks the remaining battery power of wireless terminal 100. If the remaining battery power is at least a fixed proportion or at least a fixed amount, remaining battery amount trigger unit 20c notifies measurement control unit 12 that the remaining battery amount trigger condition is satisfied. Measurement control unit 12, having received this notification, proceeds to the determination of the next trigger condition after issuing an instruction to position acquisition unit 13 to acquire position information. If there is no succeeding additional measurement trigger condition, measurement control unit 12 both issues an instruction to position acquisition unit 13 to acquire position information and issues an instruction to communication quality acquisition unit 14 to measure communication quality.

Communication quality acquisition unit 14, having received the instruction, measures the communication quality.

Step C3: Acquired Information History Trigger Condition (Position Change Determination)

Measurement control unit 12 determines whether the acquired information history trigger condition (position change determination) is satisfied or not by submitting an inquiry to acquired information history trigger unit 21. The acquired information history trigger condition (position change determination) is a condition in which a change of at least a fixed distance has occurred from the previously acquired position to the position acquired at the current time.

Acquired information history trigger unit 21, having received this inquiry, refers to the position information of memory 15 after position acquisition unit 13 measures the position of its own terminal. When there is a change of at least a fixed distance between the previously acquired position and the position acquired this time, acquired information history trigger unit 21 notifies measurement control unit 12 that the acquired information history trigger condition (position change determination) is satisfied. Measurement control unit 12, having received this notification, proceeds to the determination of the next trigger condition. If there is no succeeding additional measurement trigger condition, measurement control unit 12 issues an instruction to communication quality acquisition unit 14 to acquire the communication quality.

An example of the determination of the change from the previously acquired position to the position acquired this time is next described.

Example

When the position acquired this time is at least 50 meters distant from the previously acquired position, it is determined that the acquired information history trigger condition (position change determination) is satisfied.

Step C4: Acquired Information History Trigger Condition (Determination of the Number of Same-Location Measurements)

Measurement control unit 12 determines whether the acquired information history trigger condition (determination of the number of same-location measurements) is satisfied or not by submitting an inquiry to acquired information history trigger unit 21. The acquired information history trigger condition (determination of the number of same-location measurements) is a condition in which the number of measurements of communication quality at the position acquired this time is less than a predetermined number within a past fixed time interval.

After position acquisition unit 13 has acquired the position, acquired information history trigger unit 21, having received the inquiry, refers to position information and communication quality that were acquired within a past fixed time interval from memory 15. If the number of times that communication quality was acquired in the position acquired this time is less than a predetermined number within a past fixed time interval, acquired information history trigger unit 21 determines that the acquired information history trigger condition (determination of the number of same-location measurements) is satisfied and notifies this information to measurement control unit 12.

Measurement control unit 12, having received this notification, issues an instruction to communication quality acquisition unit 14 to measure the communication quality. Because there is no succeeding additional measurement trigger condition, the process here proceeds to the measurement of communication quality, but if there is a succeeding additional measurement trigger condition, measurement control unit 12 that has received the notification proceeds to the determination of the next trigger condition.

Communication quality acquisition unit 14, having received the instruction, measures the communication quality.

The communication quality that was acquired at communication quality acquisition unit 14 and the position information that was acquired at position acquisition unit 13 are recorded in memory 15 together with time information of the time the information was acquired.

Each of the above-described additional measurement trigger conditions are independent of each other and may be used singly, may be used by freely combining any plurality of conditions, or may all be used. In addition, the order of determination when a plurality is used can be freely set.

Returning to FIG. 4, the operations of Step A3 in Example 2 are the same as the operations of Example 1.

As described hereinabove, according to the present example, setting additional measurement trigger conditions can make the rapid consumption of battery power in the measurement of the position or the communication quality of its own terminal less apparent to the user. The effects of each of the trigger conditions are shown below.

Acquired Information History Trigger Condition (Halt Time Determination)

Halting measurement in time slots in which it can be inferred that, periodically, there is no movement of wireless terminal 100 in a fixed time interval avoids the acquisition of redundant data at the same position and enables the reduction of pointless measurements. The consumption of battery power is therefore reduced and the rapid consumption of battery power can be made less apparent to the user.

Remaining Battery Amount Trigger Condition:

A user tends to become more keenly aware of the consumption of battery power as the remaining battery power decreases. Thus, when the remaining amount of battery power falls to a fixed proportion or to a fixed amount, suspending the measurement of position information or communication quality can make the rapid consumption of battery power less apparent to the user.

Acquired Information History Trigger Condition (Position Change Determination):

Suspending the measurement of communication quality when the current position information does not change compared with information acquired within a past fixed time interval can prevent the acquisition of redundant data of communication quality of the same position. In this way, the consumption of battery power is reduced, and the rapid consumption of battery power can be made less apparent to the user.

Acquired Information History Trigger Condition (Determination of the Number of Same-Location Measurements):

Setting a limit to the number of measurements at the same location within a fixed time interval can prevent superfluous repeated measurements of communication quality. In this way, the consumption of battery power can be limited and the rapid consumption of battery power can be made less apparent to the user.

In addition, the effects obtained by providing additional transmission trigger conditions in Example 2 are the same as the effects in Example 1.

Example 3

Figure 8:
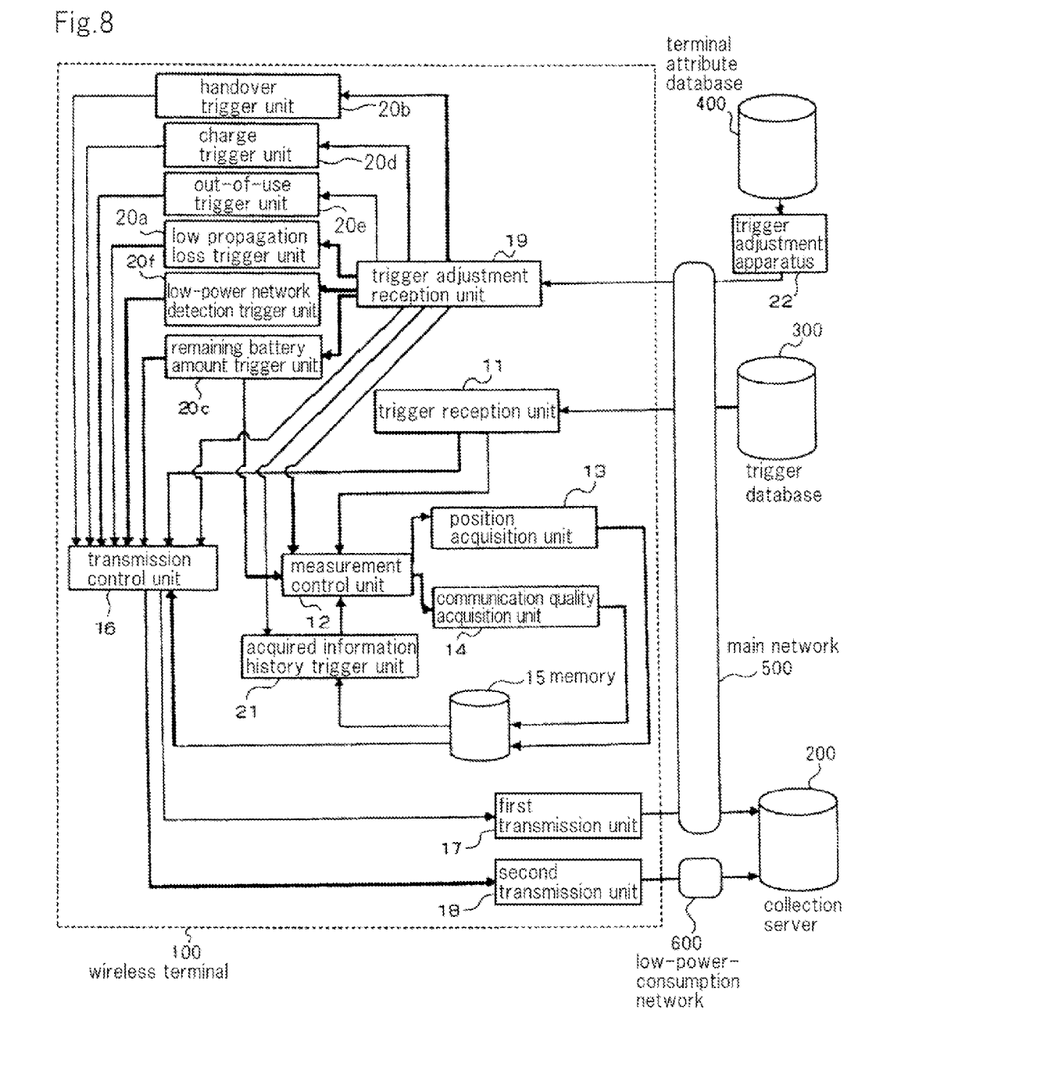
FIG. 8 is a block diagram showing the configuration of the wireless communication system and a wireless terminal of the system according to Example 3.

FIG. 8 is a block diagram showing the configuration of the wireless communication system and wireless terminal of the system according to Example 3. Referring to FIG. 8, the wireless communication system according to Example 3 includes: collection server 200, trigger database 300, terminal attribute database 400, and trigger adjustment apparatus 22.

In the wireless communication system of Example 3, terminal attribute database 400 and trigger adjustment apparatus 22 are added to the configuration of Example 2. Terminal attribute database 400 is connected to trigger adjustment apparatus 22, and trigger adjustment apparatus 22 is connected to wireless terminal 100 by way of main network 500. Collection server 200 and trigger database 300 in Example 3 are identical to Example 2.

Wireless terminal 100 includes trigger adjustment reception unit 19 in addition to the configuration of wireless terminal 100 in Example 2.

Terminal attribute database 400 holds terminal attribute information of each wireless terminal 100, these attributes being the user's frequency of use and contract content, such as the user's conversation time, packet communication charges, number of continued contract years, charge plan, and average monthly use charges.

Trigger adjustment apparatus 22 refers to the terminal attribute information included in terminal attribute database 400, calculates the battery consumption awareness degree, which is the degree to which a user is aware of battery power consumption, based on the terminal attribute information, and determines the basic transmission trigger conditions, basic measurement trigger conditions, additional transmission trigger conditions, and additional measurement trigger conditions of each wireless terminal 100 according to this battery consumption awareness degree. Trigger adjustment apparatus 22 transmits adjustment content to wireless terminals 100 in which adjustment of trigger conditions is necessary and issues instructions to adjust trigger conditions.

Trigger adjustment reception unit 19 of wireless terminal 100 receives adjustment instructions and adjustment content from trigger adjustment apparatus 22 and, in accordance with the adjustment content, adjusts basic transmission trigger conditions and additional transmission trigger conditions for controlling the transmission of area quality information and basic measurement trigger conditions and additional measurement trigger conditions for controlling the measurement of position information and communication quality.

Figure 9:
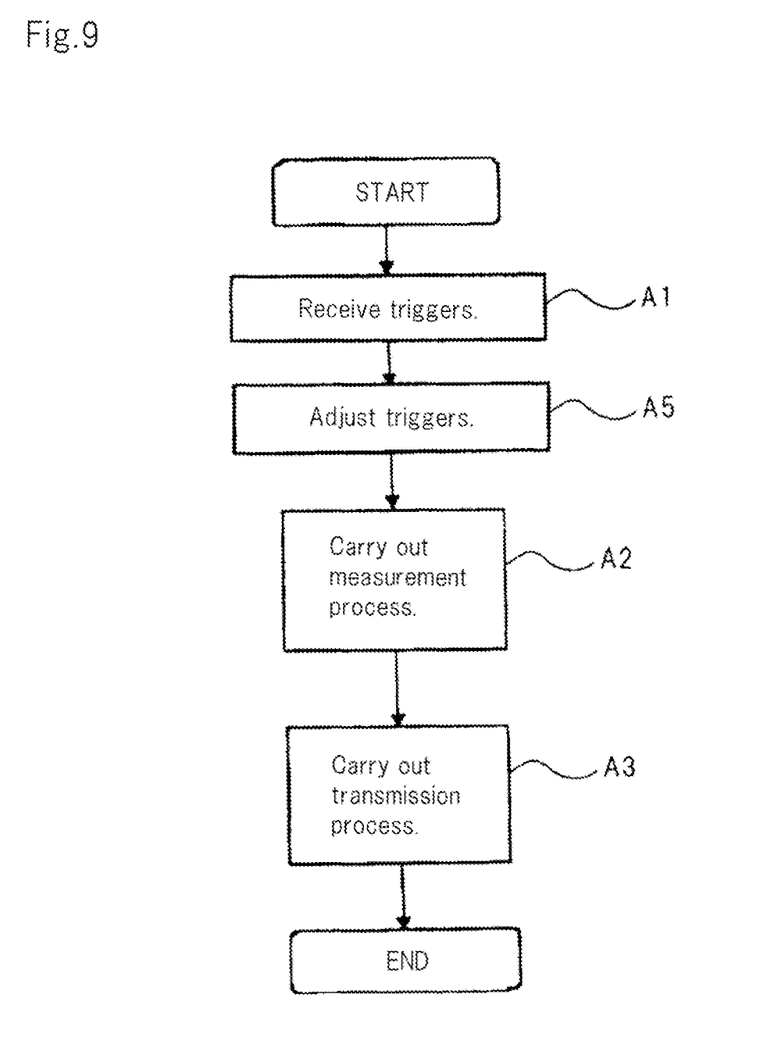
FIG. 9 is a flow chart showing the series of operations of wireless terminal 100 in Example 3.

FIG. 9 is a flow chart showing the series of operations of wireless terminal 100 in Example 3. Each of the processes of Steps A1, A2, and A3 in Example 3 are the same as respective processes of Example 2. However, there is a Step A5 between Step A1 and Step A2 in Example 3.

Trigger adjustment apparatus 22 refers to information that is contained in the terminal attribute information of terminal attribute database 400 and that indicates the user's frequency of use and contract content such as the user's conversation time, packet communication charges, number of continued contract years, charge plan, and average monthly use charges. An example of the terminal attribute information held by terminal attribute database 400 is shown below:
1. Battery capacity of the wireless terminal
2. Packet communication charges per month of the wireless terminal
3. Conversation time per month of the wireless terminal
4. Continued contract period per month of the same wireless terminal
5. Monthly use charge per month of the charge plan of the wireless terminal
6. Billed fee per month of the wireless terminal Trigger adjustment apparatus 22 determines the battery consumption awareness degree that indicates the degree to which a user is keenly aware of battery power consumption of wireless terminal 100 based on the terminal attribute information shown in the example above. Examples of the determination method are shown below:

Example 1: Threshold values are set for each of the above information items 1-6, and when the number of items for which the threshold value is surpassed among these items is three or more, trigger adjustment apparatus 22 judges that the battery power consumption awareness degree is higher than for the standard user.

Example 2: The battery power consumption awareness degree is judged to be higher than for the standard user if, of the above information items for which respective threshold values have been set, there is even a single item in which the threshold value is exceeded by at least a fixed value.

When the battery consumption awareness degree of a user is judged to be high, trigger adjustment apparatus 22 determines to adjust one, a plurality, or all of the basic transmission trigger conditions, additional transmission trigger conditions, basic measurement trigger conditions, and additional measurement trigger conditions of wireless terminal 100 such that the consumption of battery power is more greatly reduced.

Examples of adjustment are shown below:

Example 1: The measurement interval is broadened (the basic measurement trigger condition is altered).

Example 2: The threshold value of the remaining battery power is raised (the remaining battery amount trigger condition is altered).

Example 3: The threshold value of the estimated propagation loss between wireless terminal 100 and base station 501 is raised (the low propagation loss trigger condition is altered).

Trigger adjustment apparatus 22 transmits the adjustment content to wireless terminal 100 and issues an instruction to wireless terminal 100 to adjust the trigger conditions. Trigger adjustment reception unit 19 of wireless terminal 100 receives the adjustment content from trigger adjustment apparatus 22, transmits the adjustment content to corresponding trigger units 20 and 21, and brings about adjustment of the trigger conditions. Trigger units 20 and 21 that have received the adjustment content cause the adjustment content to be reflected in the trigger conditions.

According to the present example as described hereinabove, adjusting trigger conditions according to the user can make the rapid consumption of battery power less apparent to the user when collecting area quality information. A specific example is next described.

Step A5: Trigger Adjustment

Based on the terminal attribute information possessed by terminal attribute database 400, trigger adjustment apparatus 22 is able to judge whether each user of wireless terminals 100 is more keenly aware than a standard user regarding the consumption of battery power, adjust trigger conditions relating to the measurement and collection for wireless terminals 100 of users that are sensitive to battery consumption, and thus reduce the consumption of the batteries of wireless terminals 100. In this way, users that can be predicted to be sensitive to battery consumption can be made less sensitive to the rapid consumption of battery power.

Although exemplary embodiments and examples of the present invention have been described hereinabove, the present invention is not limited to just these exemplary embodiments and examples and the exemplary embodiments and examples may be combined and used or portions of the configuration may be altered within the technical concept and scope of the present invention.

What is claimed is:
1. A wireless terminal that carries out communication by a wireless circuit, comprising:
an information acquisition unit that measures communication quality of said wireless circuit;

a transmission unit that, upon receiving an instruction, transmits area quality information that includes communication quality that was measured by said information acquisition unit;
a transmission control unit that issues an instruction to said transmission unit to transmit said area quality information when basic transmission trigger conditions that have been determined in advance, as time information, and that indicate the time at which area quality information can be transmitted, are satisfied and when additional transmission trigger conditions are satisfied that have been determined that correspond to the state of said wireless terminal such that battery consumption is reduced; and
a measurement control unit that issues an instruction to said information acquisition unit to measure said communication quality when basic measurement trigger conditions are satisfied that have been determined in advance as time information and when additional measurement trigger conditions are satisfied that have been determined that correspond to the state of said wireless terminal such that battery consumption is reduced,
wherein said information acquisition unit, upon receiving an instruction from said measurement control unit, measures said communication quality.

2. The wireless terminal as set forth in claim 1, wherein said additional transmission trigger conditions are one condition, a plurality of conditions, or all conditions, as follows: a condition in which the estimated propagation loss of said wireless circuits is no greater than a predetermined threshold value; a condition in which a fixed time interval has elapsed from the last performance of handover; a condition in which the remaining amount of battery power is at least a fixed proportion or a fixed amount; a condition in which a fixed time interval has elapsed from the start of charging or from placement of the wireless terminal on a charging device; a condition in which said wireless terminal is not being used by a user; and a condition in which the wireless terminal is connected to a predetermined communication network.

3. The wireless terminal as set forth in claim 1, wherein said additional measurement trigger conditions are one condition, a plurality of conditions, or all conditions, as follows: a condition in which the current time is not within a time period that said wireless terminal does not move from a fixed range; a condition in which the remaining amount of battery power is at least a fixed proportion or at least a fixed amount; a condition in which the position of said wireless terminal that was measured at a previous time and the current time has changed by at least a fixed distance; and a condition in which the number of instances of measurement of communication quality within a fixed time interval at the position of measurement is less than a fixed number.

4. The wireless terminal as set forth in claim 3, wherein said measurement control unit: when said basic measurement trigger conditions are satisfied, first carries out either one or both of determinations of whether the current time is not within a time slot in which said wireless terminal does not move from a fixed range and whether said remaining amount of battery power is at least a fixed proportion or at least a fixed amount as first additional measurement trigger conditions; if said first additional measurement trigger conditions are satisfied, carries out either one or both of determinations of whether the position of said wireless terminal that was measured at a previous time and at the current time has changed by at least a fixed distance and whether the number of instances of measurement of communication quality within a fixed time interval at the position of measurement is less than a fixed number as second additional measurement trigger conditions; and if said second additional measurement trigger conditions are satisfied, measures the communication quality of said wireless circuits.

5. The wireless terminal as set forth in claim 1, further comprising a trigger reception unit that receives at least said basic transmission trigger conditions and sets said basic transmission trigger conditions in said transmission control unit.

6. The wireless terminal as set forth in claim 1, further comprising a trigger adjustment reception unit that receives adjustment content information for adjusting said basic transmission trigger conditions or said additional transmission trigger conditions and causes said adjustment content information to be reflected in said transmission control unit.

7. A wireless communication system comprising:
a wireless terminal that measures the communication quality of a wireless circuit and that transmits area quality information that includes said communication quality that was measured when basic transmission trigger conditions that have been determined in advance, as time information, and that indicate the time at which area quality information can be transmitted, are satisfied and when additional transmission trigger conditions are satisfied that have been determined that correspond to the state of the wireless terminal such that battery consumption is reduced; and
a collection server that receives and accumulates said area quality information from said wireless terminal,
wherein the wireless terminal comprises:
a measurement control unit that issues an instruction to said information acquisition unit to measure said communication quality when basic measurement trigger conditions are satisfied that have been determined in advance as time information and when additional measurement trigger conditions are satisfied that have been determined that correspond to the state of said wireless terminal such that battery consumption is reduced; and
an information acquisition unit that, upon receiving an instruction from said measurement control unit, measures said communication quality.

8. An area quality information collection method comprising steps of:
in a wireless terminal that carries out communication by a wireless circuit, measuring the communication quality of said wireless circuit; and
when basic transmission trigger conditions that have been determined in advance, as time information, and that indicate the time at which area quality information can be transmitted, are satisfied and when additional transmission trigger conditions are satisfied that have been determined that correspond to the state of the wireless terminal such that battery consumption is reduced, transmitting area quality information that includes said communication quality that was measured to a collection server,
wherein the wireless terminal comprises:
a measurement control unit that issues an instruction to said information acquisition unit to measure said communication quality when basic measurement trigger conditions are satisfied that have been determined in advance as time information and when additional measurement trigger conditions are satisfied that have been determined that correspond to the state of said wireless terminal such that battery consumption is reduced; and an information acquisition unit that, upon receiving an instruction from said measurement control unit, measures said communication quality.

\* \* \* \* \*